United States Patent [19]

Ohtaka et al.

[11] Patent Number: 5,787,218
[45] Date of Patent: Jul. 28, 1998

[54] LIQUID CURABLE URETHANE (METH) ACRYLATE CONTAINING RESIN COMPOSITION

[75] Inventors: Tohru Ohtaka, Kawasaki; Yuichi Hashiguchi, Yokohama; Mitsuhito Suwa, Yokkaichi; Katsutoshi Igarashi, Yokohama, all of Japan

[73] Assignee: DSM N.V., Heerlen, Netherlands

[21] Appl. No.: 513,231

[22] Filed: Aug. 10, 1995

Related U.S. Application Data

[63] Continuation of PCT/US93/00995, Feb. 19, 1993.

[51] Int. Cl.$^6$ .............................. C08F 2/50; C08G 18/32; G02B 6/02; G02B 6/14
[52] U.S. Cl. ..................... 385/123; 428/378; 522/96; 522/97; 522/90; 528/85
[58] Field of Search ........................ 522/96, 97, 90; 428/378; 385/123, 115, 145; 528/85

[56] References Cited

U.S. PATENT DOCUMENTS

| | | | |
|---|---|---|---|
| 4,843,111 | 6/1989 | Yokoshima et al. | 522/42 |
| 4,844,604 | 7/1989 | Bishop et al. | 522/97 |
| 5,093,386 | 3/1992 | Bishop et al. | 522/96 |

FOREIGN PATENT DOCUMENTS

| | | | |
|---|---|---|---|
| 2 163 755 | 3/1986 | United Kingdom | 522/96 |
| WO 91/03499 | 3/1991 | WIPO | 522/96 |

*Primary Examiner*—Susan W. Berman
*Attorney, Agent, or Firm*—Pillsbury Madison & Sutro LLP

[57] ABSTRACT

A liquid curable resin composition containing urethane bond at a concentration of $2.0 \times 10^{-3}$ mole/gm or more and comprising:

(a) a urethane (meth)acrylate having at least three cyclic structures in the molecule;

(b) a polymerizable mono-functional vinyl monomer of which the homopolymer has a glass transition point of 50° C. or more; and (c) a polymerization initiator.

The liquid curable resin composition possesses a high Young's modulus, exhibits very little contraction stress, has high tenacity and good curing characteristics. Along with these superior characteristics, the high reliability of the composition makes it a suitable coating material for optical fiber. Furthermore, since the resin composition possesses a high Young's modulus and high tenacity, it is also useful as a protective coating material for metals, plastics, wood, ceramics, glass, and the like.

15 Claims, No Drawings

LIQUID CURABLE URETHANE (METH) ACRYLATE CONTAINING RESIN COMPOSITION

This application is a Continuation of PCT/US93/00995, filed Feb. 19, 1993.

FIELD OF THE INVENTION

The present invention relates to a liquid curable resin composition which exhibits very little distortion during curing and has high strength, good curing characteristics, and excellent durability, and, in particular, to a liquid curable resin composition which is suitable as a coating material for optical fiber and optical fiber tape core wire, and the like.

BACKGROUND OF THE INVENTION

Conventionally, an optical fiber is provided with a resin coating comprising a soft primary coating layer on the surface of the optical fiber and a highly rigid secondary coating layer over the surface of the primary coating layer; these layers being applied with the object of protecting and reinforcing the bare optical fiber threads immediately after hot melt spinning of the glass fiber. Then, in order to utilize this coated optical fiber wire in practice, a so called tape structure in which four or eight strands, for example, are combined and secured in parallel on a flat surface to form a tape-like structure with a rectangular cross section is commonly known. The resin composition for forming the primary coating layer is referred to as a soft material; the resin composition for forming the secondary coating layer as a hard material; and the material for joining the optical fiber lines to make tape-structured cores is called a bundling material.

In recent years, with the development of high density optical fiber cables, materials with a higher Young's modulus and high rigidity have been sought as the hard material and the bundling material.

A curable resin used to form these coatings for optical fiber must be a liquid at room temperature and have high processability; must provide good productivity at a high curing rate; must have adequate strength and flexibility; must exhibit very little physical change during temperature changes over a wide range; must have superior heat resistance and superior resistance to hydrolysis; must show superior long term reliability with little changes in its properties over time; must show superior resistance to chemicals such as acids and alkalis; must exhibit low moisture absorption; must exhibit superior light resistance; must exhibit superior oil resistance; and must generate only a low volume of hydrogen gas which adversely affects the optical fiber.

In addition, the hard material and the bundling material used with a high density optical fiber cable must have a Young's modulus of 150 kg/mm$^2$ or greater, and must have high tenacity and high rigidity while exhibiting very little distortion during curing.

Specifically, when a thin fiber coating layer is provided for a high density optical fiber, the Young's modulus of the secondary coating layer must be high in order to maintain high quality transmission characteristics in the optical fiber. However, generally, when the resin is designed with a high Young's modulus, not only does the tenacity drops but also the contraction stress due to curing increases, particularly when the liquid curable resin is cured quickly. This contraction stress produces a small amount of distortion in the optical fiber, which causes an increase in the transmission loss through the optical fiber.

Accordingly, a material with a high Young's modulus, low contraction stress, and high tenacity is required as the secondary coating used with a high density fiber cable.

An object of the present invention is to provide a resin composition suitable for use as an optical fiber coating material which has a Young's modulus of 150 kg/mm$^2$ or greater and low contraction stress, and which has high tenacity, curability, and reliability.

SUMMARY OF THE INVENTION

The object of the present invention is achieved by the provision of a liquid curable resin composition containing urethane bonds at a concentration of $2.0 \times 10^{-3}$ mole/gm or more and comprising:

(a) a urethane (meth)acrylate having at least three cyclic structures in the molecule, (b) a polymerizable mono-functional vinyl monomer of which the homopolymer thereof has a glass transition point of 50° C. or higher, and (c) a polymerization initiator.

DETAILED DESCRIPTION OF THE INVENTION

Examples which can be given of a urethane (meth) acrylate with three or more cyclic structures in the molecule, which is component (a) used in the present invention, include a urethane (meth)acrylate with a polyol component which is a polyol with three or more aromatic structures or a polyol with three or more aliphatic structures; a urethane (meth)acrylate with a polyol component which is a polyol with one or more aromatic and/or aliphatic structures in a polyol component using an aromatic and/or an aliphatic diisocyanate in a polyisocyanate component, and the like.

The number average molecular weight of component (a) is preferably 500–2,000. If the molecular weight is less than 500, the cured material becomes too hard, resulting in less expandable product with a greater contraction stress during curing. If the molecular weight is greater than 2,000 on the other hand, the resulting cured resin may have only low hardness.

These urethane (meth)acrylates are manufactured, for example, by reacting a polyol having an aromatic and/or aliphatic structure, an aromatic or aliphatic diisocyanate, and a (meth)acrylate containing a hydroxyl group. Specifically, the isocyanate group of a diisocyanate compound reacts with the hydroxyl group of the polyol and the hydroxyl group of the (meth)acrylate compound to produce the urethane (meth) acrylate.

The reaction may be carried out by a process wherein the polyol, the diisocyanate, and the (meth)acrylate containing a hydroxyl group are reacted together in a block; a process wherein the polyol and the diisocyanate are reacted together and then reacted with the (meth)acrylate containing a hydroxyl group; a process wherein the diisocyanate and the (meth)acrylate containing a hydroxyl group are reacted together and then reacted with the polyol; and a process wherein the diisocyanate and the (meth)acrylate containing a hydroxyl group are reacted together and then reacted with the polyol, and finally again reacting the product with the (meth)acrylate containing a hydroxyl group.

Examples which can be given of a polyol with a cyclic structure used in the present invention include alkyleneoxide-addition diols to bisphenol-A, alkyleneoxide-addition diols to bisphenol-F, hydrogenated bisphenol-A, hydrogenated bisphenol-F, alkyleneoxide-addition diols of hydrogenated bisphenol-A, alkyleneoxide-addition diols of hydrogenated bisphenol-F, alkyleneoxide-addition diols of hydroquinone, alkyleneoxide-addition diols of naphthohydroquinone, alkyleneoxide-addition diols of anthrahydroquinone, 1,4-cyclohexanediol and its alkyleneoxide-addition diols, tricyclodecanediol, tricyclodecanedimethanol, pentacyclodecanediol, pentacyclodecanedimethanol; polyester polyols obtained by reacting a polyvalent alcohol such as ethylene glycol, polyethylene glycol, propylene glycol, polypropylene glycol, tetramethylene glycol, polytetramethylene glycol, 1,6-hexanediol, neopentyl glycol, 3-methyl-1,5-pentanediol, 1,9-nonanediol, 2-methyl-1,8-octanediol, and the like, with a polybasic acid, such as phthalic acid, isophthalic acid, terephthalic acid, or the like. Among these, alkyleneoxide-addition diols of bisphenol-A and tricyclodecanedimethanol are preferred. Examples of such polyols available commercially include UNIOL DA400, DA700, DA1000, DB400, (Nippon Oil and Fats Co., Ltd.); tricyclodecanedimethanol (Mitsubishi Petrochemical), and the like.

The number average molecular weight of these polyols with a cyclic structure is preferably in the 150 to 1,000 range, and most preferably in the 180 to 700 range. If the number average molecular weight is less than 150, the solubility of the polyol in the urethane (meth)acrylate monomer is poor; if greater than 1,000, it is difficult to obtain a Young's modulus for the cured resin greater than 150 kg/mm$^2$.

In addition, polyols other than polyols with a cyclic structure can be used in combination as the polyols making up the urethane (meth)acrylate used in the present invention. Examples of such polyols include polyether polyols, polyester polyol, polycarbonate polyols, polycaprolactam polyol, and other polyols without cyclic structures.

Examples of polyether polyols include polyols obtained by ring-opening polymerization or copolymerization of at least one type of compound selected from ethylene oxide, propylene oxide, butylene oxide, tetrahydrofuran, 2-methyltetrahydrofuran, 3-methyltetrahydrofuran, substituted tetrahydrofuran, substituted oxetane, tetrahydrofuran, and oxetane. Specific examples include polyethylene glycol, 1,2-polypropylene glycol, 1,3-polypropylene glycol, poly tetramethylene glycol, 1,2-polybutylene glycol, polyisobutylene glycol, copolymers of propylene oxide and tetrahydrofuran, copolymers of ethylene oxide and tetrahydrofuran, copolymers of ethylene oxide and propylene oxide, copolymers of tetrahydrofuran and 3-methyltetrahydrofuran, and copolymers of ethylene oxide and butylene oxide. Examples of such polyols available commercially include UNISAFE DC1100, UNISAFE DC1800, UNISAFE DCB1100, UNISAFE DCB1800 (Nippon Oil and Fats Co., Ltd.); PPTG4000, PPTG2000, PPTG1000, PTG2000, PTG3000, PTG650, PTGL2000, PTGL1000 (Hodogaya Chemical Co., Ltd.); EXCENOL4020, EXCENOL3020, EXCENOL2020, EXCENOL1020 (Asahi Glass); PBG3000, PBG2000, PBG1000, Z3001 (Dai-ichi Kogyo Seiyaku) and the like.

Examples which can be given of polyester polyols include polyester polyols obtained by reacting a polyvalent alcohol such as ethylene glycol, polyethylene glycol, propylene glycol, polypropylene glycol, tetramethylene glycol, polytetramethylene glycol, 1,6-hexane diol, neopentyl glycol, 3-methyl-1,5-pentanediol, 1,9-nonanediol, 2-methyl-1,8-octanediol, and the like with a polybasic acid such as maleic acid, fumaric acid, adipic acid, sebacic acid, and the like; and Kurapol P-2010 (Kuraray), and the like.

Examples which can be given of polycarbonate polyols include 1,6-hexanedicarbonate, 1,9-nonanedipolycarbonate, 2-methyl-1,8-octanepolycarbonate, and mixtures of these; and products available on the market, such as DN-980, DN-981, DN-982, DN-983 (manufactured by Nihon Polyurethane Co., Ltd.), PLACCEL-CD205, CD205HL, CD220, (manufactured by Daicel), PC-8000 (manufactured by PPG of the US), RURAPOL PNOC (Kuraray), and the like.

Examples of polycaprolactonepolyols include polycaprolactonediols obtained by reacting E-caprolactone with a divalent diol such as ethylene glycol, polyethylene glycol, propylene glycol, polypropylene glycol, tetramethylene glycol, polytetramethylene glycol, 1,2-polybutylene glycol, 1,6-hexanediol, neopentyl glycol, 1,4-butanediol, and the like, as well as PLACCEL-205, 205AL, 212, 212AL, 220, 220AL (manufactured by Daicel), and the like.

Examples of other polyols without a cyclic structure include ethylene glycol, propylene glycol, 1,4-butanediol, 1,5-pentanediol, 1,6-hexanediol, neopentyl glycol, polymethyl-6-valerolactonepolyol, polybutadiene with a terminal hydroxy group, hydrogenated polybutadiene with a terminal hydroxy group, castor oil-modified polyols, diol compounds with a polydimethylsiloxane terminal group, polydimethylsiloxane carbitol-modified diols, and the like.

The number average molecular weight of these polyols is preferably in the 100 to 1,000 range, and most preferably in 200 to 700 range. These polyols are preferably used in combination with the polyols with a cyclic structure mentioned above, and, particularly preferably one mole of these polyols is reacted for one mole of the polyols with a cyclic structure, three moles of diisocyanate and two moles of a (meth)acrylate with a hydroxyl group to produce urethane (meth)acrylate having polyol residual groups with cyclic structures and these polyol residual groups in the same molecule. Examples of desirable polyol compounds among these which can be used together are polytetramethylene glycol with a number average molecular weight between 450 and 650, polycaprolactam diol with a number average molecular weight of 550, for example, PTG450 and PTG650 (Hodogaya Chemical Co., Ltd.), and PLACCEL-205H (manufactured by Daicel).

Examples of diisocyanates include 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexyl isocyanate), 2,2,4-trimethylhexamethylene diisocyanate, bis(2-isocyanateethyl)fumarate, 6-isopropyl-1,3-phenyl diisocyanate, 4-diphenylpropane diisocyanate, lysine diisocyanate, hydrogenated diphenylmethane diisocyanate, hydrogenated xylylene diisocyanate, tetramethylxylylene diisocyanate, and the like. In particular, 2,4-tolylene diisocyanate, isophorone diisocyanate, xylylene diisocyanate, and methylenebis(4-cyclohexyl isocyanate), are preferable. Examples of a (meth)acrylate with a hydroxyl group include 2-hydroxyethyl (meth)acrylate, 2-hydroxypropyl (meth)acrylate, 2-hydroxybutyl (meth) acrylate, 2-hydroxy-3-phenyloxypropyl (meth)acrylate, 1,4-butanediol mono(meth)acrylate, 2-hydroxyalkyl(meth) acryloyl phosphate, 4-hydroxycyclohexyl (meth)acrylate, 1,6-hexanediol mono(meth)acrylate, neopentyl glycol mono (meth)acrylate, trimethylolpropane di(meth)acrylate, trimethylolethane di(meth)acrylate, pentaerythritol tri(meth) acrylate, dipentaerythritol penta(meth)acrylate, (meth) acrylates represented by the following formulas (1) and (2),

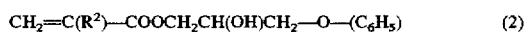

wherein $R^2$ is a hydrogen atom or a methyl group and n is an integer from 1 to 15.

In addition, compounds obtained by an addition reaction between compounds containing a glycidyl group, such as, alkyl glycidyl ether, allyl glycidyl ether, glycidyl (meth) acrylate, or the like, and (meth)acrylic acid can be used. Among these (meth)acrylates with a hydroxyl group, particularly desirable are 2-hydroxyethyl (meth)acrylate, 2-hydroxypropyl (meth)acrylate, and the like.

The respective amounts of the polyol, diisocyanate, and (meth)acrylate containing a hydroxyl group which are used are such that 1.1 to 2 equivalents by weight of the isocyanate group contained in a diisocyanate compound and 0.2 to 1.5 equivalents by weight of the hydroxyl group of a (meth) acrylate containing a hydroxyl group are present for one equivalent by weight of the hydroxyl group contained in a polyol. However, it is preferable that the amounts of the hydroxyl groups in the polyol and the acrylate-be almost equivalent to the amount of the isocyanate group contained the diisocyanate compound.

In the reaction of these compounds, 0.01 to 1.0 parts by weight of a urethanization catalyst such as copper naphthenate, cobalt naphthenate, zinc naphthenate, n-butyltin-laurate, triethylamine, 1,4-diazobicyclo(2.2.2) octane, 2,6,7-trimethyl-1,4-diazobicyclo(2.2.2)octane and the like, are preferably used to 100 parts by weight of the total reactants used in these reactions. The reaction temperature is normally 10° to 90° C., and preferably 30° to 80° C.

The amount of component (a), urethane (meth)acrylate with three or more cyclic structures in the molecule, contained in the total composition of the present invention is usually 10 to 99 wt %, but 20 to 70% is considered ideal in maintaining the coating characteristics when covering the optical fiber wire, and in maintaining the flexibility and long term reliability of the coating material after curing.

Also, a urethane (meth)acrylate in which two moles of a (meth)acrylate compound containing a hydroxyl group are reacted with one mole of diisocyanate can be blended into the liquid curable resin composition of the present invention. Examples of such urethane (meth)acrylates include reaction compounds of hydroxyethyl (meth)acrylate and 2,4-tolylene diisocyanate, reaction compounds of hydroxyethyl (meth) acrylate and isophorone diisocyanate, reaction compounds of hydroxypropyl (meth)acrylate and 2,4-tolylene diisocyanate, reaction compounds of hydroxypropyl (meth) acrylate and isophorone diisocyanate, reaction compounds of the compound represented by formula (2) and 2,4-tolylene diisocyanate, reaction compounds of the compound represented by the structural formula (2) and isophorone diisocyanate, and the like.

Examples of component (b) of the present invention, which is a polymerizable monofunctional vinyl monomer for which the glass transition point of the homopolymer is 50° C. or higher, include lactams containing a vinyl group, such as N-vinyl pyrrolidone, N-vinyl caprolactam, and the like; (meth)acrylates containing an alicyclic structure, such as isobornyl (meth)acrylate, bornyl (meth)acrylate, tricyclodecanyl (meth)acrylate, dicyclopentanyl (meth)acrylate, dicyclopentenyl (meth)acrylate, cyclohexyl (meth)acrylate, and the like; benzyl (meth)acrylate, 4-butylcyclohexyl (meth)acrylate, acryloylmorpholine, vinyl imidazole, vinylpyridine, and the like. Among these, lactams containing a vinyl group and (meth)acrylates containing an alicyclic structure are preferable, and, in particular, N-vinyl pyrrolidone, N-vinyl caprolactam, isobornyl (meth)acrylate, and dicyclopentanyl (meth)acrylate, a combination of N-vinyl pyrrolidone and isobornyl (meth)acrylate, and a combination of N-vinyl caprolactam and isobornyl (meth) acrylate are particularly desirable.

The amount of component (b) of the present invention, which is a polymerizable monofunctional vinyl monomer for which the glass transition point of the homopolymer thereof is 50° C. or higher, contained in the total composition of the present invention is usually 15 to 80 wt %, but 20 to 70% is preferable. If less than 15%, the viscosity of the composition is too high and the coating characteristics are poor, and, in addition, the tenacity of the cured material drops and the contraction on curing is too high; if greater than 80%, the curing speed is undesirably low.

Further, in order to increase the Young's modulus and reduce the curing contraction ratio, it is preferable to have a composition mix of 20 to 85% of component (a), 5 to 30% of N-vinyl pyrrolidone or N-vinyl caprolactam, and 10 to 50% of isobornyl (meth)acrylate.

A thermal polymerization initiator or a photopolymerization initiator can be used as component (c), the polymerization initiator, of the present invention.

When the liquid curable resin composition of the present invention is heat cured, a thermal polymerization initiator such as a peroxide, an azo compound, or the like is usually used. Specific examples include benzoyl peroxide, t-butyl oxybenzoate, azobisisobutyronitrile, and the like.

When the liquid curable resin composition of the present invention is cured by irradiation, a photopolymerization initiator and, as required, a photosensitivity enhancing agent are used. Examples of photopolymerization initiators include 1-hydroxycyclohexylphenyl ketone, 2,2-dimethoxy-2-phenyl acetophenone, xanthone, fluorenone, benzaldehyde, fluorene, anthraquinone, triphenylamine, carbazole, 3-methyl acetophenone, 4-chloro-benzophenone, 4,4'-dimethoxy benzophenone, 4,4'-diamino-benzophenone, Michler's ketone, benzoin propyl ether, benzoin ethyl ether, benzyldimethylketal, 1-(4-isopropyl phenyl)-2-hydroxy-2-methylpropane-1-one, 2-hydroxy-2-methyl-1-phenylpropane-1-one, thioxanthone, diethylthioxanthone, 2-isopropylthioxanthone, 2-chlorothioxanthone, 2-methyl-1-(4-(methylthio)phenyl)-2-morpholinopropane-1-on, 2,4, 6-trimethylbenzoyldiphenyl-phosphine oxide, IRGACURE 184, 651, 500, 907, CG1369, CG24-61 (manufactured by Ciba Geigy), LUCERIN LR8728 (manufactured by BASF), DAROCUREL 116, 1173 (manufactured by Merck), UBECRYL-P36 (manufactured by the UCB Co.) and the like. In addition, examples of photosensitivity enhancing agents are triethylamine, diethylamine, N-methyldiethanolamine, ethanolamine, 4-dimethylaminobenzoic acid, 4-dimethylaminoisomethylbenzoate, 4-dimethyl aminoethylbenzoate, 4-dimethylaminoisoamylbenzoate, and commercial products such as UBECRYL-P102, 103, 104, 105 (manufactured by the UCB Co.) and the like.

When the liquid curable resin composition of the present invention is cured by the combined use of heat and ultraviolet light, a heat polymerization initiator and a photopolymerization initiator can also be jointly used. These polymerization initiators are generally used in an amount of 0.1 to 10% of the total composition, and preferably 0.5 to 7%.

In addition to components (a), (b), and (c), other materials, such as other curable oligomers and polymers, reaction diluents, and other additives may be blended, as required, with the liquid curable resin composition of the present invention in a range in which the characteristics of the present invention are not impaired.

Examples of other curable oligomers and polymers which can be given include polyester (meth)acrylates, epoxy (meth)acrylates, polyamide (meth)acrylates, siloxane polymers containing a (meth)acryloyl oxide group, and the like.

Monofunctional compounds and polyfunctional compounds can be used as reaction dilution agents.

Examples of monofunctional compounds which can be given include 2-hydroxyethyl (meth)acrylate, 2-hydroxypropyl (meth)acrylate, 2-hydroxybutyl (meth) acrylate, methyl (meth)acrylate, ethyl (meth)acrylate, propyl (meth)acrylate, isopropyl (meth)acrylate, butyl (meth) acrylate, amyl (meth)acrylate, isobutyl (meth)acrylate, t-butyl (meth)acrylate, pentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, stearyl (meth) acrylate, tetrahydrofurfuryl (meth)acrylate, butoxyethyl (meth)acrylate, ethoxydiethylene glycol (meth)acrylate, benzyl (meth)acrylate, phenoxyethyl (meth)acrylate, polyethylene glycol mono(meth)acrylate, polypropylene glycol mono(meth)acrylate, methoxyethylene glycol (meth) acrylate, ethoxyethyl (meth)acrylate, methoxypolyethylene glycol (meth)acrylate, methoxypolypropylene glycol (meth) acrylate, diacetone (meth)acrylamide, isobutoxymethyl (meth) acrylamide, N,N-dimethyl (meth)acrylamide, t-octyl (meth)acrylamide, dimethylaminoethyl (meth) acrylate, diethylaminoethyl (meth)acrylate, 7-amino-3,7-dimethyloctyl (meth)acrylate, N,N-diethyl (meth) acrylamide, N,N-dimethylaminopropyl (meth)acrylamide, hydroxybutyl vinyl ether, lauryl vinyl ether, cetyl vinyl ether, 2-ethylhexyl vinyl ether, and compounds represented by the following formulas (3) to (5).

$$CH_2=C(R^2)-COO(R^3O)_n-R^4 \quad (3)$$

wherein $R^2$ indicates a hydrogen atom or a methyl group; $R^3$ is an alkylene group with 2 to 6, preferably 2 to 4, carbon atoms; $R^4$ is a hydrogen atom or an alkyl group with 1 to 12, preferably 1 to 9, carbon atoms, and m is an integer from 0 to 12, preferably from 1 to 8.

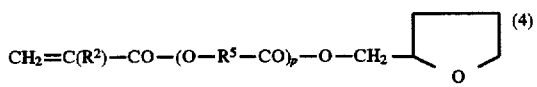

(4)

wherein $R^2$ is the same as above, $R^5$ is an alkylene group with 2 to 8, preferably 2 to 5, carbon atoms, and p is an integer from 1 to 8, preferably from 1 to 4.

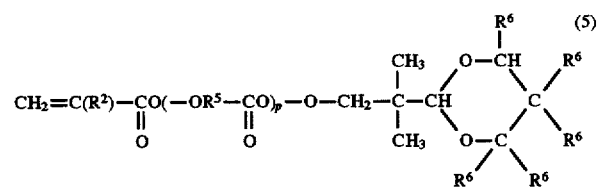

(5)

wherein $R^2$, $R^5$, and p are the same as above, $R^6$ is a hydrogen atom or a methyl group.

Examples of commercial products which can be used are ARONIX MI11, MI13, HI 14, M117, (manufactured by Toagosei Chemical Industry), TC110S, R629, R644 (manufactured by Nippon Kayaku) and BISCOT 3700 (manufactured by Osaka Organic Chemicals) and the like.

Examples of polyfunctional compounds include trimethylolpropane tri(meth)acrylate, pentaerythritol tri(meth) acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth) acrylate, neopentyl glycol di(meth)acrylate, trimethylolpropanetrioxydiethyl (meth)acrylate, tris(2-hydroxyethyl) isocyanurate tri(meth)acrylate, tris(2-hydroxyethyl) isocyanurate di(meth)acrylate, tricyclodecanedimethanol di(meth)acrylate, epoxy (meth)acrylates which are (meth) acrylate addition compounds of diglycidyl ethers of bisphenol-A, triethylene glycol divinyl ether, and the like. Also, examples of commercial products which can be used are UPIMA-UV SA1002, SA2007 (manufactured by Mitsubishi Petrochemicals), BISCOAT 700 (manufactured by Osaka Organic Chemicals), EAYAAAD R604, DPCA-20, DPCA-30, DPCA-60, DPCA-120, Mx-620, D-310, D-330 (manufactured by Nippon Kayaku), ARONIX M210, M215, M315, M325, (manufactured by Toagosei Chemical Industry), and the like. Particularly desirable among these examples are tricyclodecanedimethanol di(meth)acrylate (YUPINA-UV SA1002) and BISCOAT 700.

Other additives which can, as required, be blended into the resin composition for coating optical fiber of the present invention include, for example, antioxidants, colorants, ultraviolet absorbents, photostabilizers, silane coupling agents, thermal polymerization inhibitors, leveling agents, surfactants, storage stabilizers, plasticizers, lubricants, solvents, fillers, age resistors, wettability agents, coated surface improvers, and the like. Commercial antioxidants which can be used are IRGANOX 1010, 1035, 1076, 1222 (manufactured by Ciba Geigy), ANTIGEN P, 3C, FR (manufactured by Sumitomo Chemical), and the like. Commercial ultraviolet absorption agents include TINUVIN P234, 320, 326, 327, 328, 329, 213 (manufactured by Ciba Geigy), Seesorb 102, 103, 501, 202, 712, 704 (manufactured by Cypro Chemical), and the like. Commercial photostabilizers include TINUVIN 292, 144, 622LD (manufactured by Ciba Geigy), SANOL LS770 (manufactured by Sankyo Chemical), SUMISORB TM-061 (manufactured by Sumitomo Chemical), and the like. Examples of silane coupling agents which can be given are γ-aminopropyl triethoxysilane, γ-mercaptopropyl trimethoxysilane, γ-methacryloxypropyl trimethoxysilane, and commercial products such as SH6062, 6030 (manufactured by Toray Silicone), EBE903, 603, 403 (manufactured by Shin-etsu Chemical), and the like.

The urethane concentration among the components of the liquid curable resin composition of the present invention is $2.0 \times 10^{-3}$ moles/gm or greater. A concentration smaller than $2.0 \times 10^{-3}$ moles/gm is undesirable, because the Young's modulus of the cured material is not as high as 150 kg/mm². A urethane concentration is also undesirable because of an increase in the viscosity of the resulting composition. A preferable urethane concentration is from $2.0 \times 10^{-3}$ to $3.0 \times 10^{-3}$ moles/gm.

The viscosity of the liquid curable resin composition of the present invention is normally in the 200 to 20,000 cp range at 25° C., and is preferably 2,000 to 10,000 cp/25° C. When the liquid curable resin composition of the present invention is used as a secondary covering material for an optical fiber elemental wire or as a bundling material for a core wire, the Young's modulus of the cured composition is preferably 150 to 250 kg/mm² and more preferably 180 to 240 kg/mm².

The liquid curable resin composition of the present invention can be cured by heat and/or irradiation. Here, irradiation means infrared rays, visible light, ultraviolet rays, x-ray, electron rays, α-rays, β-rays, and γ-rays.

EXAMPLES

The present invention will be illustrated in more detail in the following description of exemplary embodiments which are given for illustration of the invention and are not intended to be limiting thereof.

Example 1

806 gm of isobornyl acrylate, 1,156 gm of 2,4-tolylene diisocyanate, 2.4 gm of dibutyltindilaurate, and 1 gm of 2,6-di-t-butyl-4-methylphenol as a polymerization inhibitor, and 0.2 gm of phenothiazine were charged to a reaction vessel equipped with a stirrer. After cooling with ice water to 10° C., 651 gm of hydroxyethyl acrylate was added while controlling the temperature to 20° C. or lower. After this addition was completed, the mixture was further stirred for one hour at 10° to 20° C., and 544 gm of tricyclodecanedimethanol (Mitsubishi petrochemical) and 670 gm of polytetramethylene glycol with a number average molecular weight of 650 (PTG650; Hodogaya Chemical Co., Ltd.) were added while maintaining the temperature at 50° C. or below. The mixture was then stirred for 5 hours at 50° to 60° C. to complete the reaction, thus obtaining 3,830.6 gm of a mixture of a urethane acrylate with three or more cyclic structures in the molecule and a number average molecular weight of 1,075 (79%) and isobornyl acrylate (21%).

To the above mixture, 806 gm of isobornyl acrylate, 864 gm of N-vinyl pyrrolidone, 83 gm of 2,4,6-trimethylbenzoyl-diphenyl phosphine oxide (LUCIRIN LR8728 manufactured by BASF), and 17 gm of IRGANOX 1035 (manufactured by Ciba Geigy) were added, and the mixture was stirred for 3 hours at 45° to 55° C. to obtain 5,600.6 gm of the liquid curable resin composition of the present invention. The concentration of urethane bonded to the resulting components was $2.23 \times 10^{-3}$ moles/gm.

Example 2

715 gm of isobornyl acrylate, 1,365 gm of isophorone diisocyanate, 4.4 gm of butyltindilaurate, 1.3 gm of 2,6-di-t-butyl-4-methylphenol, and 0.4 gm of phenothiazine were charged to a reaction vessel equipped with a stirrer. After cooling with ice water to 10° C., 549 gm of hydroxyethyl acrylate was added while controlling the temperature to 20° C. or lower. After this addition was completed, the mixture was further stirred for one hour at 10° to 20° C., and 459 gm of tricyclodecanedimethanol and 922 gm of polytetramethylene glycol with a number average molecular weight of 650 were added while maintaining the temperature at 50° C. or below. The mixture was then stirred for 5 hours at 50° to 60° C. to complete the reaction to obtain 4,016.1 gm of a mixture of a urethane acrylate with three or more cyclic structures in the molecule and a number average molecular weight of 1,390 (82%) and isobornyl acrylate (18%).

To this mixture, 715 gm of isobornyl acrylate, 770 gm of N-vinyl pyrrolidone, 83 gm of 2,4,6-trimethylbenzoyl-diphenylphosphine oxide, and 17 gm of IRGANOX 1035 (manufactured by Ciba Geigy) were added, and the mixture was stirred for 3 hours at 45° to 55° C. to obtain 5,601.1 gm of the liquid curable resin composition of the present invention. The concentration of urethane bonded to the resulting components was $2.20 \times 10^{-3}$ moles/gm.

Example 3

300 gm of tricyclodecanedimethanol diacrylate (UPIMASA1002; manufactured by Mitsubishi Petrochemicals), 1,021 gm of 2,4-tolylene diisocyanate, 1.4 gm of dibutyltindilaurate, 0.7 gm of 2,6-di-t-butyl-4-methylphenol, and 0.2 gm of phenothiazine were charged to a reaction vessel equipped with a stirrer. After cooling with ice water to 10° C., 1,038 gm of hydroxyethyl acrylate was added while controlling the temperature to 20° C. or below. After this addition was completed the mixture was further stirred for one hour at 10° to 20° C., and 340 gm of an ethyleneoxide-added diol of bisphenol-A with a number average molecular weight of 400 (UNZOL DA400; Nippon Oil and Fats Co., Ltd.) and 353 gm of polytetramethylene glycol with a number average molecular weight of 650 (PTG650; Hodogaya Chemical Co., Ltd.) were added while maintaining the temperature at 50° C. or below. The mixture was then stirred for 5 hours at 50° to 60° C. to complete the reaction, thus obtaining 3,054.3 gm of a mixture of a urethane acrylate with three or more cyclic structures; a urethane acrylate with a number average molecular weight of 980 which is a reaction product of tolylene isocyanate and hydroxyethyl acrylate on the two ends of the ethyleneoxide-added diol of bisphenol-A with a number average molecular weight of 400 (27%); a urethane acrylate with a number average molecular weight of 1,130 which is a reaction product with tolylene diisocyanate and hydroxyethyl acrylate on the two ends of the polytetramethylene glycol with a number average molecular weight of 650 (22%); a urethane acrylate which is a reaction product of 2 moles of hydroxyethyl acrylate and 1 mole of tolylene diisocyanate (41%); and isobornyl acrylate (10%).

To this mixture, 1,450 gm of tricyclodecanedimethanol acrylate, 650 gm of isobornyl acrylate, 350 gm of N-vinyl pyrrolidone, 75 gm of 2,4,6-trimethylbenzoyldiphenylphosphine oxide, 15 gm of benzophenone, and 15 gm of IRGANOX 1035 (manufactured by Ciba Geigy) were added, and the mixture was stirred for 3 hours at 45° to 55° C. to obtain 5,609.3 gm of the liquid curable resin composition of the present invention. The concentration of urethane bonded to the resulting components was $2.30 \times 10^{-3}$ moles/gm.

Comparative Example 1

1,648 gm of 2,4-tolylene diisocyanate, 5 gm of butyltindilaurate, 1.5 gm of 2,6-di-t-butyl-4-methylphenol, and 1,155 gm of tricyclodecanedimethanol diacrylate were charged to a reaction vessel equipped with a stirrer. After cooling with ice water to 10° C., 2,197 gm of hydroxyethyl acrylate was added while controlling the temperature to 50° C. or below. After this addition was completed, the mixture was further stirred for five hours at 50° to 60° C. to complete the reaction, thus obtaining 5,006.3 gm of a mixture of a urethane acrylate with one cyclic structure; a urethane acrylate which is a reaction product of 2 mols of hydroxyethyl acrylate to 1 mol of tolylene diisocyanate (77%); and tricyclodecanedimethanol diacrylate (23%).

To this mixture, 495 gm of N-vinyl pyrrolidone, 83 gm of 2,4,6-trimethylbenzoyldiphenylphosphine oxide, and 17 gm of IRGANOX 1035 (manufactured by Ciba Geigy) were added, and the mixture was stirred for 3 hours at 45° to 55° C. to obtain 5,601.3 gm of a liquid curable resin composition. The concentration of urethane bonded to the resulting components was $3.38 \times 10^{-3}$ moles/gm.

Comparative Example 2

806 gm of isobornyl acrylate, 855 gm of 2,4-tolylene diisocyanate, 2.4 gm of dibutyltindilaurate, 1 gm of 2,6-di-t-butyl-4-methylphenol, and 0.2 gm of phenothiazine were added to a reaction vessel equipped with a stirrer. After cooling with ice water to 10° C., 570 gm of hydroxyethyl acrylate were charged while controlling the temperature to 20° C. or below. After this addition was completed, the mixture was further stirred for one hour at 10° to 20° C., and 1,596 gm of polytetramethylene glycol with a number average molecular weight of 650 (PTG650; Hodogaya Chemical Co., Ltd.) was added while maintaining the temperature at 50° C. or below. The mixture was then stirred for 5 hours at 50° to 60° C. to complete the reaction, thus obtaining 3,830.6 gm of a mixture of a urethane acrylate reacted with tolylene isocyanate and hydroxyethyl acrylate on the two ends of the polytetramethylene glycol with a number average molecular weight of 650 (79%); and isobornyl acrylate (21%).

To this mixture, 806 gm of isobornyl acrylate, 864 gm of N-vinyl pyrrolidone, 83 gm of 2,4,6-trimethylbenzoyl-diphenylphosphine oxide, and 17 gm of IRGANOX 1035 (manufactured by Ciba Geigy) were added, and the mixture was stirred for 3 hours at 45° to 55° C. to obtain 5,600.6 gm of a liquid curable resin composition. The concentration of urethane bonded to the resulting components was $1.75 \times 10^{-3}$ moles/gm.

Test Examples

A film test and a drawing test were carried out for each liquid curable resin composition prepared as Examples 1 to 3 and Comparative Examples 1 and 2. The results are given in Table 1.

Film Tests

1. Preparation of Test Leaf

Using a 381 μm thick applicator, each of the various liquid composition's were applied to glass plates, and cured films of a thickness of 250 μm were obtained by irradiation with ultraviolet rays at 500 mJ/cm². Next, the cured films were peeled from the glass plate and tempered for 24 hours at a temperature of 23° C. and 50% RH, to obtain the test leaves.

2. Measurement of Tensile Characteristics

Tension tests were carried out using a No. 2 dumbbell to conform to JIS K7113. The Young's modulus was measured at a drawing speed of 1 mm/min, and the breaking strength and breaking elongation were measured at 50 mm/min.

Drawing Tests

Using an optical fiber drawing machine, one layer of a composition was applied to copper wire and then cured by irradiation with ultraviolet rays to obtain a copper wire coated with resin. The diameter of the copper wire core material of the coated copper wires was 130 μm, and of the covered wire 190 μm; the thickness of the covering film being 30 μm. The covered copper wire was prepared at a drawing speed of 360 m/min. A macaroni-like test material was obtained by extracting the copper wire, and the following tests were performed.

1. Measurement of Young's Modulus

The hollow, cured material was used as a test leaf. This hollow, cured material was threaded through holes in two circular aluminum plates with an opening and fixed with an instantaneous adhesive, with a space between the plates being 25 mm. Tension tests were carried out by pulling the two circular plates apart using a chuck. Other than using the hollow, cured material as a test leaf and using a tool as a chuck for clamping and pulling the two circular plates, the test conformed to JIS K7113.

2. Measurement of Curing Contraction Ratio

The curing contraction ratio was obtained from the following equation, in which r1 and r2 are the densities at 25° C. of the composition and the cured material respectively. Curing contraction ratio (%)=$(1-r_1/r_2) \times 100$.

TABLE 1

| Evaluation Item | Examples | | | Comparative Examples | |
|---|---|---|---|---|---|
| | 1 | 2 | 3 | 1 | 2 |
| Film Test (Drawing characteristics) | | | | | |
| Young's modulus (kg/mm) | 170 | 160 | 180 | 180 | 40 |
| Breaking strength (kg/mm²) | 6.8 | 6.5 | 6.9 | 5.0 | 3.5 |
| Breaking elongation (%) | 12 | 13 | 10 | 3 | 60 |
| Drawing Test | | | | | |
| Young's modulus (kg/mm²) | 230 | 210 | 240 | 230 | 50 |
| Cure contraction rate (%) | 5.6 | 5.4 | 6.0 | 9.5 | 5.0 |

The liquid curable resin composition of the present invention exhibits low contraction stress at a high Young's modulus, and has high tenacity, curability, and reliability, and is therefore a particularly superior coating material for optical fiber. In addition, because this composition has a high Young's modulus and high tenacity, it is suitable as a protective coating material for all types of substrates such as, for example, metal, plastic, wood, ceramics, glass, and the like.

What is claimed:

1. A liquid curable resin composition containing urethane bonds at a concentration of $2.0 \times 10^{-3}$ mole/gm of resin composition or more and comprising:
   (a) a urethane (meth)acrylate having at least three cyclic structures in the molecule, wherein said urethane (meth)acrylate is derived from at least one polyol selected from the group consisting of alkyleneoxide-addition diols of bisphenol-A, alkyleneoxide-addition diols of bisphenol-F, alkyleneoxide-addition diols of hydrogenated bisphenol-A, alkyleneoxide-addition diols of bisphenol-F, alkyleneoxide-addition diols of hydroquinone, alkyleneoxide-addition diols of naphthohydroquinone, alkyleneoxide-addition diols of anthrahydroquinone, tricyclodecanediol, tricyclodecanedimethanol, pentacyclodecanediol and pentacyclodecanedimethanol;
   (b) a polymerizable mono-functional vinyl monomer of which the homopolymer thereof has a glass transition point of 50° C. or more; and
   (c) a polymerization initiator,
wherein the resin, when cured, has a Young's modulus of greater than 150 kg/mm².

2. A composition as in claim 1 wherein said urethane methacrylate is additionally derived from at least one or more polyols selected from the group consisting of polyether polyols, polyester polyols, polycarbonate polyols and polycaprolactam polyols.

3. A composition as in claim 1 wherein the urethane (meth)acrylate has a number average molecular weight in the range of from about 500 to about 2000.

4. A composition as in claim 1 wherein the urethane component of said urethane (meth)acrylate is derived from the reaction of the polyol with a diisocyanate.

5. A composition as in claim 4 wherein the diisocyanate has at least one cyclic structure.

6. A composition as in claim 1 wherein the mono-functional vinyl monomer is selected from the group consisting of lactams containing a vinyl group, (meth)acrylates containing an alicyclic structure, benzyl (meth)acrylate, acryloylmorpholine, vinyl imidazole and vinyl pyridine.

7. A composition as in claim 6 wherein the monofunctional vinyl monomer is 4-butylcyclohexyl (meth) acrylate.

8. A composition as in claim 1 wherein the polymerization initiator is a thermal polymerization initiator.

9. A composition as in claim 1 wherein the polymerization initiator is a photopolymerization initiator.

10. A composition as in claim 1 which further comprises at least one additional component selected from the group consisting of antioxidants, colorants, ultraviolet absorbents, photostabilizers, silane coupling agents, thermal polymerization inhibitors, leveling agents, surfactans, storage stabilizers, plasticizers, lubricants, solvents, fillers, age resistors, wettability agents and coated surface improvers.

11. A composition as in claim 1 which further comprises at least one additional component selected from the group consisting of polyester (meth)acrylates, epoxy (meth)acrylates, polyamide (meth)acrylates and siloxane polymers, wherein said siloxane polymers contain a (meth)acryloyl functional group.

12. A composition as in claim 1 which further comprises at least one additional component selected from the group consisting of a monoethylenically unsaturated reactive diluent and a polyethylenically unsaturated reactive diluent.

13. An optical fiber having a cured coating formed by applying and curing the composition of claim 1.

14. The optical fiber of claim 13 wherein said cured coating constitutes a secondary coating layer on said fiber.

15. The optical fiber of claim 13 wherein said optical fiber forms a part of an optical fiber ribbon or cable structure wherein said cured coating constitutes a bundling material.

* * * * *